(12) United States Patent
Sugawara

(10) Patent No.: US 6,671,101 B2
(45) Date of Patent: Dec. 30, 2003

(54) COLOR COMBINING OPTICAL ELEMENT, COLOR SEPARATION OPTICAL ELEMENT, AND PROJECTION TYPE DISPLAY APPARATUS USING THEM

(75) Inventor: Saburo Sugawara, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 09/828,401

(22) Filed: Apr. 6, 2001

(65) Prior Publication Data

US 2002/0003668 A1 Jan. 10, 2002

(30) Foreign Application Priority Data

Apr. 7, 2000 (JP) .......................... 2000-106989

(51) Int. Cl.[7] .......................... G02B 27/14; H04N 9/07; G03B 21/00; G03B 21/28
(52) U.S. Cl. ...................... 359/634; 348/336; 348/338; 353/31; 353/81
(58) Field of Search ................ 348/336, 338; 359/634; 353/31, 81

(56) References Cited

U.S. PATENT DOCUMENTS 5,098,183 A * 3/1992 Sonehara .................... 353/121
5,621,486 A * 4/1997 Doany et al. ................ 348/751
5,644,432 A * 7/1997 Doany ......................... 359/634

FOREIGN PATENT DOCUMENTS

JP 10-104763 4/1998

* cited by examiner

Primary Examiner—Hung Xuan Dang
Assistant Examiner—Joseph Martinez
(74) Attorney, Agent, or Firm—Morgan & Finnegan, L.L.P.

(57) ABSTRACT

Provided are a color combining optical element capable of forming a good projected image on a screen surface while permitting scaling-down of entire apparatus and a projection image display apparatus using it. A color combining optical element is constructed of three or more prisms and in such structure that it has a prism provided with a surface as a surface serving as a total reflection surface and as a transmissive surface on the extreme exit side and two dichroic mirror layers for reflecting light of mutually different wavelength regions, that the two dichroic mirror layers are located so as not to cross each other, that an outline of a cross section of a prism placed between the two dichroic mirror layers, cut by a plane along a color composition direction, is comprised of four or more segments, and that at least one of flection points in the cross section of surfaces without the dichroic mirror layers is present at an inner position of the color combining optical element with respect to a segment connecting two ends of segments in the cross section of surfaces with the two dichroic mirror layers.

40 Claims, 7 Drawing Sheets

COLOR COMBINING OPTICAL ELEMENT, COLOR SEPARATION OPTICAL ELEMENT, AND PROJECTION TYPE DISPLAY APPARATUS USING THEM

BACKGROUND OF THE INVENTION

1. Field of the Invention

The present invention relates to a color combining optical element and projection type image display apparatus using it and is suitably applicable, for example, to color liquid crystal projectors for projecting an enlarged image from projection original images based on color liquid crystal panels, onto a screen surface.

Related Background Art

A variety of proposals have been made heretofore for projection apparatus (liquid crystal projectors) constructed to project an enlarged image from projection original images based on liquid crystal light valves, onto the screen surface.

In the projection apparatus of this type, image display elements (liquid crystal panels) based on images of three colors of R, G, and B are illuminated by respective color light beams obtained by color separation of light from a light source. The respective color beams transmitted by the image display elements are guided through a color combining means to be projected through one projection lens onto the screen surface or the like.

Conventionally, a cross dichroic prism is known as one of color combining optical elements used in the liquid crystal projectors. FIG. 5 is a schematic view to show the major part of a projection type image display apparatus using the conventional cross dichroic prism. The cross dichroic prism XDP used in the projection image display apparatus illustrated in FIG. 5 is composed of four rectangular prisms 31, 32, 33, and 34, and dichroic layers DM1, DM2 having two types of reflection wavelength regions cross inside the prism.

In the projection image display apparatus of FIG. 5, a parabolic mirror 2 converts white light emitted from light source 1, into a nearly parallel beam, and a first fly-eye lens 3 consisting of an array of rectangular lenses forms light source images in almost center regions of respective lenses in a second fly-eye lens 4 consisting of an array of rectangular lenses. Then a polarization converting element 5 emits beams of only one polarization component and the beams of one polarization component are laid over image modulating means 16, 18, 20 by a first positive lens 6. Blue light reflected by a blue reflecting dichroic mirror 8 is guided via a light reflecting mirror 9 and a second positive lens 15 to be converged on a display portion of image modulating means 16 for blue. The green component out of green and red components transmitted by the blue reflecting dichroic mirror 8 is reflected by a dichroic mirror 10 for reflecting green, and is guided through a third positive lens 17 to be converged on a display portion of image modulating means 18 for green. The light of the red component transmitted by the dichroic mirror 10 is guided via a fourth positive lens 27, a high reflecting mirror 28, a fifth positive lens 29, a high reflecting mirror 30, and a sixth positive lens 26 to be converged on a display portion of image modulating means 16 for red.

Light beams modulated by the respective color image modulating means 16, 18, 20 undergo color composition in the cross dichroic prism XDP composed of the first prism 31, second prism 32, third prism 33, and fourth prism 34, to be projected as a color image onto the screen not shown, by a projection lens 35.

Unless the cross dichroic prism as a color combining prism illustrated in FIG. 5 is made by accurately forming the angles of the four rectangular prisms and polishing each of the surfaces thereof, the dichroic layers DM1, DM2 will be bent at the apexes of the rectangular prisms.

This caused the problem that the projected image appeared double on the unrepresented screen and thus resolution sensation became considerably poor. In order to keep good resolution on the screen, the four rectangular prisms 31, 32, 33, 34 had to be joined without a level difference at their joint surfaces, and thus close attention had to be paid for the joining work. The right-angled ridge portions of the rectangular prisms had to be made without any such defects as kinks, chips, or the like, and if the width of the ridge portions was too wide there arose the problem that the cross part of the cross prism was projected as a vertical stripe on the screen. As described, the conventional cross dichroic prism was made by the extremely difficult prism processing and prism joining works and thus required considerable time and expenditure for manufacturing.

On the other hand, in order to avoid the above-stated problems of the cross dichroic prism, Japanese Patent Application Laid-Open No. 10-104763 describes the proposal of a liquid crystal projector using a color separation prism consisting of three prisms, which has been used as a color separation means in video cameras and the like. However, since the shape of the color separation prism in this application was not optimized so as to minimize the optical path length of the prism, it necessitated the prism path length close to double that of the cross dichroic prism of FIG. 7A, as illustrated in FIG. 8A.

Since the specification of the above application describes nothing about the material and refractive index of the prism, it is not clear whether the air-reduced path length is reduced by increasing the refractive index of the prism.

In the proposal of the above application, as described above, the manufacturing of the prism itself was easier than that of the cross-dichroic prism, but, because of the large size of the prism and the long path length of the prism, the back focus of the projection lens had to be set considerably longer than that in the case of use of the cross dichroic prism. For this reason, the projection lens became large in size and, as to the optical performance of the projection lens, there arose the problem of increase in chromatic aberration of magnification in particular.

SUMMARY OF THE INVENTION

An object of the present invention is to propose a compact color combining optical element and a compact color separation optical element shorter in the optical path length and easier to make up than the prism of the above application and provide projection type image display apparatus using the color combining optical element and color separation optical element.

A color combining optical element according to one aspect of the present invention is a color combining optical element comprising three or more prisms, which has a prism element comprising a common surface as a surface serving as a total reflection surface and as a transmissive surface on the extreme exit side and which has two dichroic mirror layers for reflecting light of mutually different wavelength regions, wherein the two dichroic mirror layers are located so as not to cross each other, an outline of a cross section of a prism placed between the two dichroic mirror layers, cut by a plane along a color composition direction, is comprised of four or more segments, and at least one of flection points in the cross section of surfaces without the dichroic mirror layers is present at an inner position of the color separation optical element with respect to a segment connecting two ends of segments in the cross section of surfaces with the two dichroic mirror layers.

A color combining optical element according to a further aspect of the invention is a color combining optical element comprising three or more prisms, which has a prism comprising a common surface as a surface serving as a total reflection surface and as a transmissive surface on the extreme exit side and which has two dichroic mirror layers for reflecting light of mutually different wavelength regions, wherein the two dichroic mirror layers are located so as not to cross each other, an outline of a cross section of a prism placed between the two dichroic mirror layers, cut by a plane along a color composition direction, is comprised of four or more segments, and at least one of interior angles in the outline of the cross section is an angle exceeding 180°.

A color combining optical element according to a still further aspect of the invention is a color combining optical element comprising four or more prisms, which has a prism comprising a common surface as a surface serving as a total reflection surface and as a transmissive surface on the extreme exit side and which has two dichroic mirror layers for reflecting light of mutually different wavelength regions, wherein the two dichroic mirror layers are located so as not to cross each other, and wherein a plurality of prisms are placed between the two dichroic mirror layers.

A color combining optical element according to a still further aspect of the invention is a color combining optical element comprising: in the order named hereinafter from the light exit side, a first prism comprising three or more optically smooth surfaces, among which one surface comprises a common surface as a surface serving as a transmissive surface and as a total reflection surface; a second prism comprising two or more optically smooth surfaces; a third prism comprising three or more optically smooth surfaces; and a fourth prism comprising two or more optically smooth surfaces, wherein a dichroic mirror layer for reflecting first color light is provided on one or both of opposed surfaces of the first prism and the second prism and a dichroic mirror layer for reflecting second color light on one or both of opposed surfaces of the third prism and the fourth prism.

In one aspect of the above color combining optical element, the first prism and the second prism are joined with each other with said dichroic mirror layer in between and the third prism and the fourth prism are joined with each other with said dichroic mirror layer in between.

In another aspect of the above color combining optical element, the second prism and the third prism are joined with each other.

In another aspect of the above color combining optical elements, an angle $\theta 1$ between a surface with the dichroic mirror layer on the exit side and said common surface, satisfies the following condition:

$20°<\theta 1<35°$.

In another aspect of the above color combining optical elements, an angle $\theta 2$ between said common surface and a surface with the dichroic mirror layer on the entrance side out of said two dichroic mirror layers, satisfies the following condition:

$40°<\theta 2<50°$.

In another aspect of the above color combining optical elements, a refractive index Nd for d-line of a material of said prisms satisfies the following condition:

$1.56<Nd$.

In another aspect of the above color combining optical elements, an Abbe's number vd of a material of said prisms satisfies the following condition:

$40<vd$.

In another aspect of the above color combining optical element, each of said third prism and said fourth prism is comprised of a right triangular prism having apex angles of 45°.

In another aspect of the above color combining optical element, said third prism and fourth prism are integrally formed with each other.

A color combining optical element according to another aspect of the invention is a color combining optical element comprising three or more prisms, wherein one of the three prisms has a prism comprising a surface serving as a total reflection surface and as a transmissive surface on the extreme exit side, the optical element has two dichroic mirror layers for reflecting color light of two types of different wavelength regions, the two dichroic mirror layers are located so as not to cross each other, and wherein when $\theta 1$ represents an angle between the common surface and the exit-side dichroic mirror layer and $\theta 2$ an angle between the common surface and the entrance-side dichroic mirror layer, the angles $\theta 1$ and $\theta 2$ satisfy the following conditions:

$20°<\theta 1<35°$, and $40°<\theta 2<50°$.

In another aspect of the above color combining optical element, when Nd represents a refractive index for d-line of a material of said prisms and vd an Abbe's number of the material of the prisms, Nd and vd satisfy the following conditions:

$1.56<Nd$, and $40<vd$.

A color combining optical element according to still another aspect of the invention is a color combining optical element comprising: in the order named hereinafter from the light exit side, a first prism comprising three or more surfaces, among which one surface comprises a surface serving as a transmissive surface and as a total reflection surface; a second prism comprising two or more surfaces; a third prism comprising three or more surfaces; and a fourth prism comprising two or more surfaces, wherein a dichroic mirror layer for reflecting first color light is provided on one or both of opposed surfaces of the first prism and the second prism, a dichroic mirror layer for reflecting second color light on one or both of opposed surfaces of the third prism and the fourth prism, and each of the third prism and the fourth prism is comprised of a right triangular prism having apex angles of 45°.

In another aspect of the above color combining optical element, when $\theta 1$ represents an angle between said common surface and the exit-side dichroic mirror layer out of said two dichroic mirror layers and $\theta 2$ an angle between the common surface and the entrance-side dichroic mirror layer, the angles $\theta 1$ and $\theta 2$ satisfy the following conditions:

$20°<\theta 1<35°$, and $40°<\theta 2<50°$.

In another aspect of the above color combining optical elements, when θ1 represents an angle between said common surface and the exit-side dichroic mirror layer out of said two dichroic mirror layers and Nd a refractive index for d-line of a material of said prisms, θ1 and Nd satisfy the following conditions:

20°<θ1<35°, and 1.56<Nd.

In another aspect of the above color combining optical elements, the dichroic mirror layer farther from the exit side out of said two dichroic mirror layers is in contact with each of light incidence surfaces into two prisms in contact with said dichroic mirror layer.

A projection type display apparatus according to one aspect of the invention is a projection type image display apparatus comprising either one of the color combining optical elements described above.

A projection type image display apparatus according to another aspect of the invention is a projection type image display apparatus comprising light generating means for emitting light including color components of the three primary colors, color separation means for separating the light emitted from the light generating means, into three primary color light beams, three image modulating means for receiving the three primary color light beams and modulating the primary color light beams to form optical images, color combining means for composing one composite beam from output light beams from the three image modulating means, and projection means for projecting the composite light beam composed by the color combining means, wherein said color combining means is comprised of either one of the color combining optical elements described above.

A color separation optical element according to one aspect of the invention is a color separation optical element comprising three or more prisms, which has a prism having a common surface as a surface serving as a total reflection surface and as a transmissive surface on the extreme entrance side and which has two dichroic mirror layers for reflecting light of mutually different wavelength regions, wherein the two dichroic mirror layers are located so as not to cross each other, an outline of a cross section of a prism placed between the two dichroic mirror layers, cut by a plane along a color separation direction, is comprised of four or more segments, and at least one of flection points in the cross section of surfaces without the dichroic mirror layers is present at an inner position of the color separation optical element with respect to a segment connecting two ends of segments in the cross section of surfaces with the two dichroic mirror layers.

A color separation optical element according to another aspect of the invention is a color separation optical element comprising three or more prisms, which has a prism comprising a common surface as a surface serving as a total reflection surface and as a transmissive surface on the extreme entrance side and which has two dichroic mirror layers for reflecting light of mutually different wavelength regions, wherein the two dichroic mirror layers are located so as not to cross each other, an outline of a cross section of a prism placed between the two dichroic mirror layers, cut by a plane along a color separation direction, is comprised of four or more segments, and at least one of interior angles in the outline of the cross section is an angle exceeding 180°.

A color separation optical element according to still another aspect of the invention is a color separation optical element comprising four or more prisms, which has a prism comprising a common surface as a surface serving as a total reflection surface and as a transmissive surface on the extreme entrance side and which has two dichroic mirror layers for reflecting light of mutually different wavelength regions, wherein the two dichroic mirror layers are located so as not to cross each other, and wherein a plurality of prisms are placed between the two dichroic mirror layers.

A color separation optical element according to still another aspect of the invention is a color separation optical element comprising: in the order named hereinafter from the light entrance side, a first prism comprising three or more optically smooth surfaces, among which one surface comprises a common surface serving as a transmissive surface and as a total reflection surface; a second prism comprising two or more optically smooth surfaces; a third prism comprising three or more optically smooth surfaces; and a fourth prism comprising two or more optically smooth surfaces, wherein a dichroic mirror layer for reflecting first color light is provided on one or both of opposed surfaces of the first prism and the second prism and a dichroic mirror layer for reflecting second color light on one or both of opposed surfaces of the third prism and the fourth prism.

In another aspect of the above color separation optical element, the first prism and the second prism are joined with each other with said dichroic mirror layer in between and the third prism and the fourth prism are joined with each other with said dichroic mirror layer in between.

In another aspect of the above color separation optical element, the second prism and the third prism are joined with each other.

In another aspect of the above color separation optical elements, an angle θ1 between a surface with the dichroic mirror layer on the entrance side and said common surface, satisfies the following condition:

20°<θ1<35°.

In another aspect of the above color separation optical elements, an angle θ2 between said common surface and the exit-side dichromic mirror layer, satisfies the following condition:

40°<θ2<50°.

In another aspect of the above color separation optical elements, a refractive index Nd for d-line of a material of said prisms satisfies the following condition:

1.56<Nd.

In another aspect of the above color separation optical elements, an Abbe's number vd of a material of said prisms satisfies the following condition:

40<vd.

In another aspect of the above color separation optical element, each of said third prism and said fourth prism is comprised of a right triangular prism having apex angles of 45°.

In another aspect of the above color separation optical element, said third prism and fourth prism are integrally formed with each other.

A color separation optical element according to another aspect of the invention is a color separation optical element comprising three or more prisms, wherein one of the three prisms has a prism comprising a surface serving as a total reflection surface and as a transmissive surface on the extreme entrance side, the optical element has two dichroic mirror layers for reflecting color light of two types of different wavelength regions, the two dichroic mirror layers are located so as not to cross each other, and wherein when θ1 represents an angle between the common surface and the entrance-side dichroic mirror layer and θ2 an angle between the common surface and the exit-side dichroic mirror layer, the angles θ1 and θ2 satisfy the following conditions:

$20°<θ1<35°$, and $40°<θ2<50°$.

In another aspect of the above color separation optical element, when Nd represents a refractive index for d-line of a material of said prisms and νd an Abbe's number of the material of the prisms, Nd and νd satisfy the following conditions:

$1.56<Nd$, and $40<νd$.

A color separation optical element according to another aspect of the invention is a color separation optical element comprising: in the order named hereinafter from the light entrance side, a first prism comprising three or more surfaces, among which one surface comprises a surface serving as a transmissive surface and as a total reflection surface; a second prism comprising two or more surfaces; a third prism comprising three or more surfaces; and a fourth prism comprising two or more surfaces, wherein a dichroic mirror layer for reflecting first color light is provided on one or both of opposed surfaces of the first prism and the second prism, a dichroic mirror layer for reflecting second color light on one or both of opposed surfaces of the third prism and the fourth prism, and each of the third prism and the fourth prism is comprised of a right triangular prism having apex angles of 45°.

In another aspect of the above color separation optical elements, when θ1 represents an angle between said common surface and the entrance-side dichroic mirror layer and θ2 an angle between the common surface and the exit-side dichroic mirror layer, the angles θ1 and θ2 satisfy the following conditions:

$20°<θ1<35°$, and $40°<θ2<50°$.

In another aspect of the above color separation optical elements, when θ1 represents an angle between said common surface and the entrance-side dichroic mirror layer out of said two dichroic mirror layers and Nd a refractive index for d-line of a material of said prisms, θ1 and Nd satisfy the following conditions:

$20°<θ1<35°$, and $1.56<Nd$.

In another aspect of the above color separation optical elements, the dichroic mirror layer farther from the entrance side out of said two dichroic mirror layers is in contact with each of light incidence surfaces into two prisms in contact with said dichroic mirror layer.

A projection type image display apparatus according to another aspect of the invention comprises either one of the color separation optical elements described above.

A projection type image display apparatus according to another aspect of the invention is a projection type image display apparatus comprising light generating means for emitting light including color components of the three primary colors, color separation means for separating the light emitted from the light generating means, into three primary color light beams, three image modulating means for receiving the three primary color light beams and modulating the primary color light beams to form optical images, color combining means for composing one composite beam from the output light beams from the three image modulating means, and projection means for projecting the composite light beam composed by the color combining means, wherein said color separation means is comprised of either one of the color separation optical elements described above.

DETAILED DESCRIPTION OF THE PREFERRED EMBODIMENTS

Figure 1:
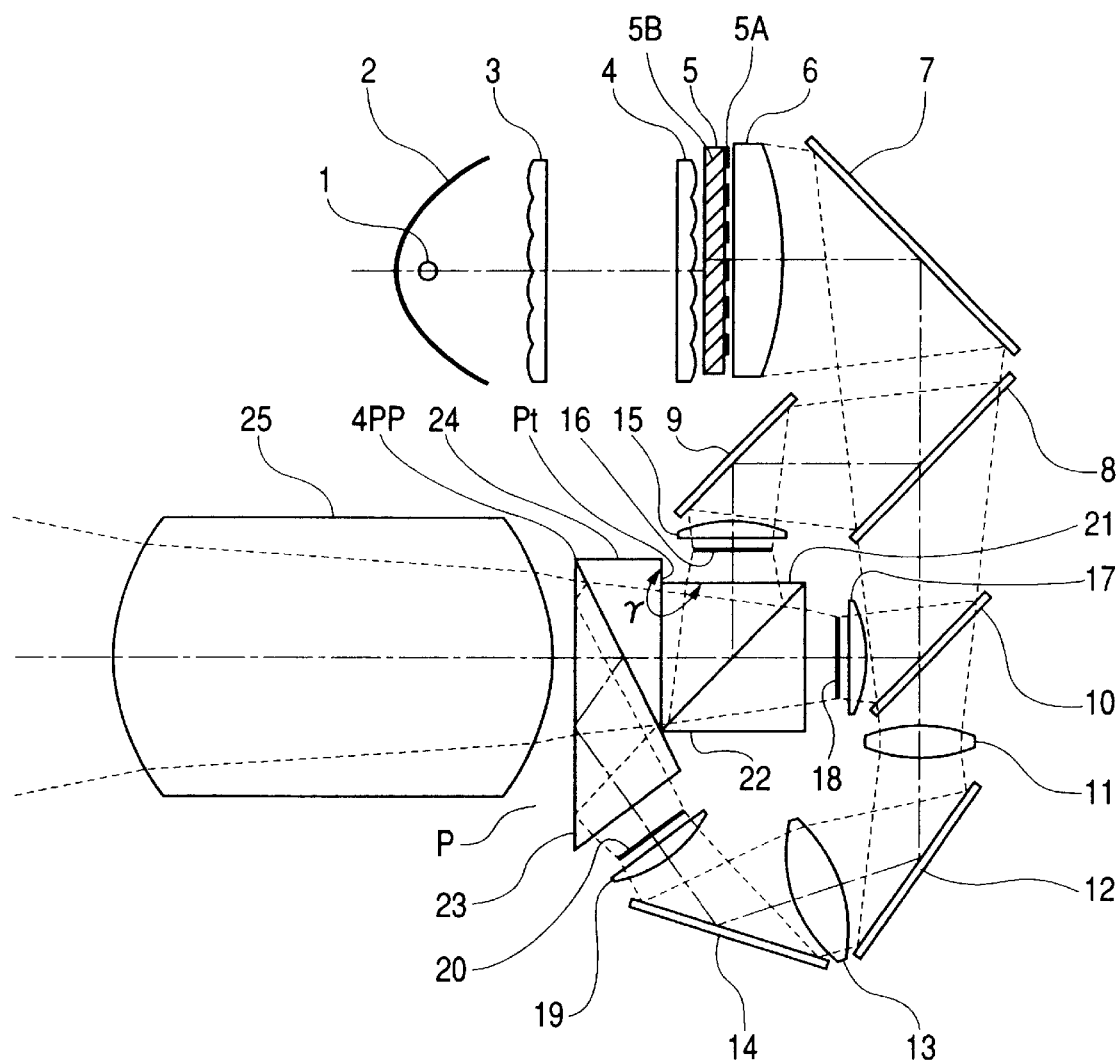
FIG. 1 is a schematic view to show the major part of Embodiment 1 of the projection image display apparatus using the color combining optical element of the present invention.

FIG. 1 is a schematic view to show the major part of Embodiment 1 of the image projection apparatus using the color combining optical element of the present invention. In the figure reference numeral 1 designates a light source (arc tube) such as a metal halide lamp or the like. Numeral 2 denotes a reflector (reflecting member) whose reflective surface consists of a parabolic surface or an ellipsoidal surface. FIG. 1 shows an example of a parabolic mirror.

Light emitted from the light-emitting region of the light source 1 is reflected by the reflector 2 to be converted into parallel light and this parallel light is guided into a first fly-eye lens (first optical element) 3.

The first fly-eye lens 3 is constructed by arranging a plurality of rectangular lenses (convex lenses) of positive refracting power on a flat panel.

Numeral 4 represents a second fly-eye lens (second optical element), which is constructed by arranging a plurality of rectangular lenses (planoconvex lenses) of positive refracting power on a flat panel.

The first fly-eye lens 3 consisting of the array of rectangular lenses forms light source images in almost central regions of the respective lenses of the second fly-eye lens 4 consisting of the array of rectangular lenses.

Figure 10:
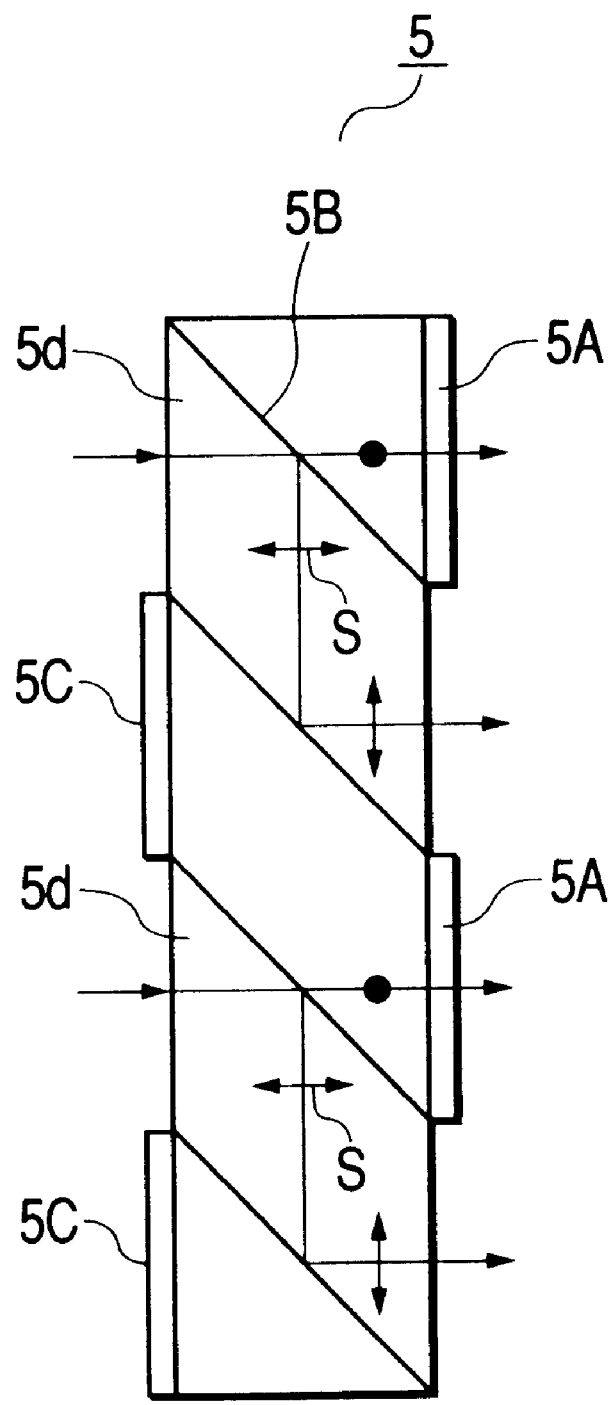
FIG. 10 is a cross-sectional view of major part of the polarization converting element of FIG. 1.

Numeral 5 indicates a polarization converting element array, which has, for example, the structure illustrated in FIG. 10. Each polarization converting element converts non-polarized (randomly polarized) light incident thereto, into linearly polarized light having a specific direction of polarization and emits the linearly polarized light. Polarization directions of polarized light beams emerging from the respective polarization converting elements agree with each other, as illustrated in FIG. 10.

Light incident to the polarization converting element 5 is separated into P-polarized light and S-polarized light at a polarization separating layer 5B in the element. The P-polarized light is transmitted by the polarization separating surface 5B while the S-polarized light is reflected thereby. A half wave plate 5A converts the phase of the P-polarized light so as to align the direction of polarization axis thereof with that of the S-polarized light. By this, all the beams emitted from the polarization converting element 5 become polarized light having the polarization axis along the same direction.

The beams emerging from the polarization converting element 5 are deflected by a first positive lens 6 and undergo color separation into the colors of R, G, and B in a color separation system described hereinafter. The beams thus separated are laid on display portions 16, 18, 20 of image modulating devices consisting of liquid crystal panels (liquid crystal display elements) to be modulated in the respective colors of R, G, and B.

In the present embodiment, the blue light reflected by blue reflecting dichroic mirror 8 out of the beams emerging from the first positive lens 6 is guided via a high reflective mirror 9 and a second positive lens 15 to be converged on the display portion of the blue image modulating means 16.

The green component out of the green and red light components transmitted by the blue reflecting dichroic mirror 8 is reflected by dichroic mirror 10 for reflecting green, and is then guided through a third positive lens 17 to be converged on the display portion of the green image modulating means 18. The light of the red component transmitted by the dichroic mirror 10 is guided via a fourth positive lens 11, a high reflecting mirror 12, a fifth positive lens 13, a high reflecting mirror 14, and a sixth positive lens 19 to be converged on the display portion of the red image modulating means 20. Since the red channel has a longer path length than the other color channels, the fourth positive lens 11 and fifth positive lens 13 have the function of a relay lens for forming an image at the magnification of about 1.

The beams modulated by the respective color image modulating means 16, 18, 20 then undergo color combining in a color combining prism (color combining optical element) P as a color combining means consisting of a first prism 23, a second prism 24, a third prism 21, and a fourth prism 22, and are projected as a color image onto the unrepresented screen through a projection lens 25.

The structure of the color combining prism P used in Embodiment 1 of FIG. 1 will be described below in detail with reference to FIG. 4.

The color combining prism (color combining optical element) P of the present embodiment can also be used as a color separation prism (color separation optical element) for separating white light from the projection lens 25 into a plurality of color beams, but it will be described herein as to only the action as a color combining means.

The incidence and emergence of the beams is simply opposite in use as the color separation optical element and the fundamental optical action is exactly the same.

Figure 4:
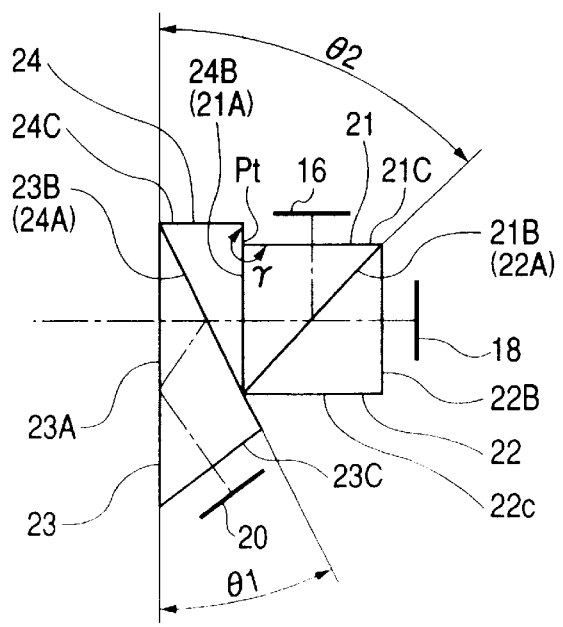
FIG. 4 is a cross-sectional view along the direction of color separation, of the color combining optical element of FIG. 1.
Figure 5:
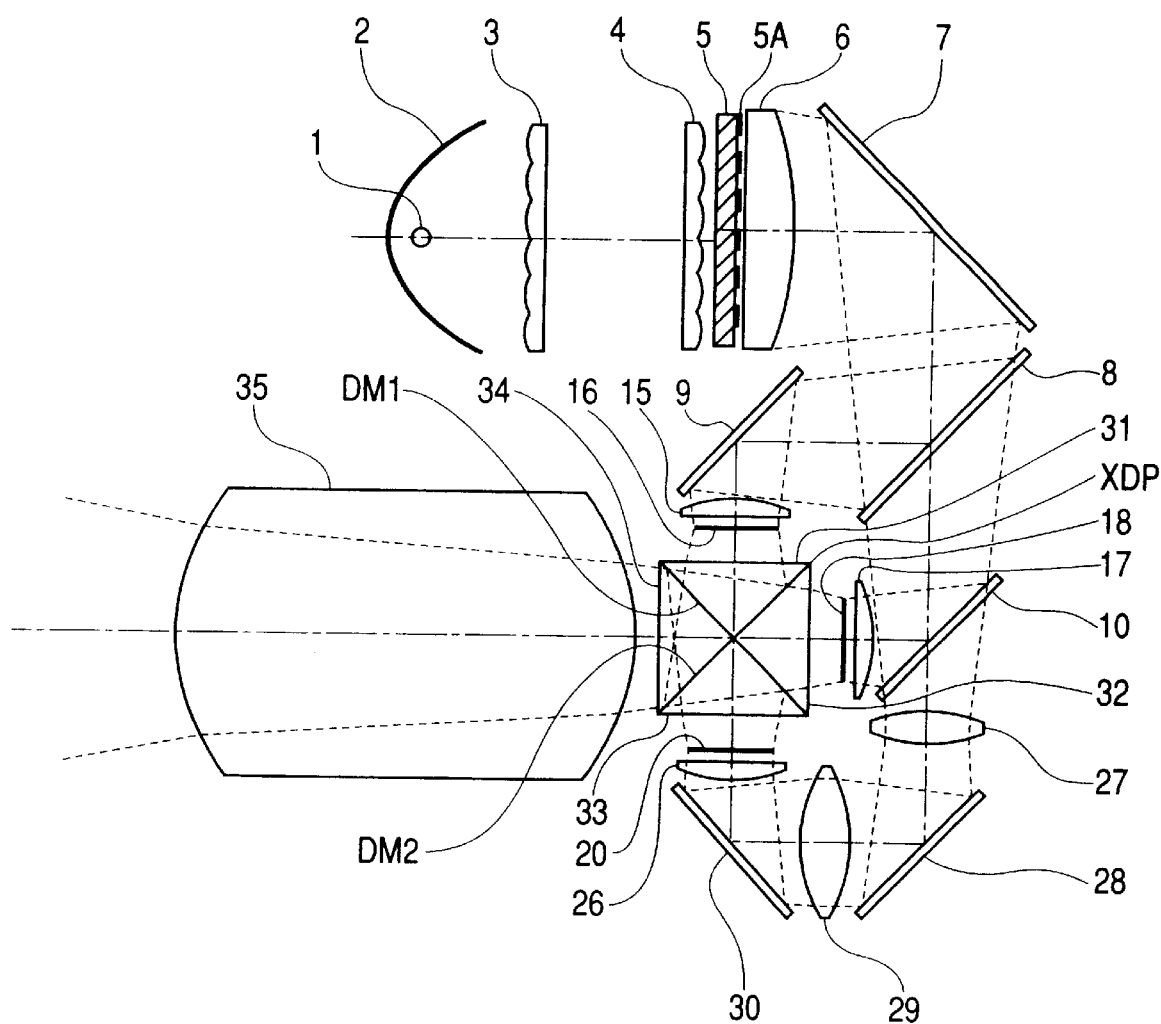
FIG. 5 is a cross-sectional view of the conventional projection type image display apparatus.

In FIG. 4, numerals 16, 18, 20 correspond to the image modulating means of FIG. 1. The color combining prism, as illustrated in FIG. 4, is comprised of: the first prism 23, which consists of a common surface 23A serving as a light-transmitting surface and as a total reflection surface, a dichroic surface 23B provided with a dichroic film for reflecting the red component but transmitting the blue and green components, and a light-transmitting surface 23C; the second prism 24 having two light-transmitting surfaces 24A, 24B; the third prism 21, which consists of two light-transmitting surfaces 21A, 21C, and a dichroic surface 21B provided with a dichroic film for reflecting the blue component but transmitting the green component; and the fourth prism 22 having two light-transmitting surfaces 22A, 22B.

In FIG. 4, it is desirable to form an antireflection coat on the light-transmitting surfaces 23A, 23C, 21C, 22B, in order to prevent loss in light amount due to surface-reflected light on the interface between air and glass.

In order to prevent occurrence of ghost due to internal reflection inside the prism, the surface 24C of the second prism and the surface 22C of the fourth prism are preferably not polished surfaces but sanded surfaces, and are more preferably coated with a black paint.

The dichroic film formed on the dichroic surface 23B of the first prism 23 may be formed on the light-transmitting surface 24A of the second prism 24. Since the second prism 24 is smaller than the first prism 23, more prisms can be set in an evaporation chamber during evaporation operation of the dichroic film, thus presenting the advantage of reduction in manufacturing cost.

The dichroic film formed on the dichroic surface 21B of the third prism 21 may also be formed on the light-transmitting surface 22A of the fourth prism 22.

The color combining prism P according to the present invention is constructed of the four prisms in order to shorten the optical path length of the prism, as against color separation prisms consisting of three prisms commonly used in the conventional color separation prisms and the like.

By splitting the prism between the two dichroic mirror layers 23B, 21B into two parts, the effective beam is prevented from being eclipsed on the light exit side by the prism and the prism 21 on the light entrance side is made smaller in size.

Further, the prism is made of glass with a higher refractive index than before, in order to shorten the air-reduced path length of the prism. For example, the trade name S-BSM25 (the refractive index of 1.65844 for d-line and the Abbe's number of 50.9), the trade name S-BSM15 (the refractive index of 1.62299 for d-line and the Abbe's number of 58.2), which are available from Ohara K.K., and so on are preferably applicable, because they are high in the refractive index and in the transmittance.

For much higher refractive indices, the trade name S-LAL14 (the refractive index of 1.6968 for d-line and the Abbe's number of 55.5), the trade name S-LAL8 (the refractive index of 1.71300 for d-line and the Abbe's number of 53.9), which are also available from Ohara K.K., and so on are preferably applicable for the prisms of the present invention, because they have the high transmittance across the entire visible region.

The dichroic surface 23B between the first prism 23 and the second prism 24 is set at the angle of 27° relative to the light exit surface 23A of the first prism 23, thereby shortening the optical path length of the prism and suppressing the occurrence of ghost due to reflection on the dichroic surface.

The total reflection condition is adequately met on the light exit surface 23A of the first prism 23.

The dichroic surface 21B between the third prism 21 and the fourth prism 22 is set at the angle of 45° relative to the light exit surface 23A of the first prism 23, thereby shortening the optical path length of the prism.

Since the decrease in the optical path length of the prism permits scaling-down of the prism itself and decrease in the back focus of the projection lens, the projection lens and the projection apparatus using it are constructed in compact scale and with high performance.

The features of the invention will be described below as to each aspect of the invention as the color combining optical element P. The color combining optical element according to a first aspect of the invention is a color combining optical element comprising three or more prisms joined with each other, wherein one of the three prisms has a prism comprising a surface as a common surface serving as a total reflection surface and as a light-transmitting surface, the optical element has two dichroic mirror layers for reflecting color light of two types of different wavelength regions, the two dichroic mirror layers are located so as not to cross each other, an outline of a cross section of a prism placed between the two dichroic mirror layers, cut by a plane along a color composition direction, is comprised of four or more segments (24A, 24B, 24C, 21C, 21B), and at least one Pt of flection points in the cross section of the surfaces without the dichroic mirror layers is present at an inner position of the color combining optical element with respect to a segment connecting two ends of segments (23B, 21B) in the cross section of the surfaces with the two dichroic mirror layers (see FIG. 4).

Here the plane along the color composition direction means a plane including three rays of the three different colors before the color composition and a composite ray composed by the color composition element. The term "cross" means that two line segments intersect with each other.

Figure 6A:
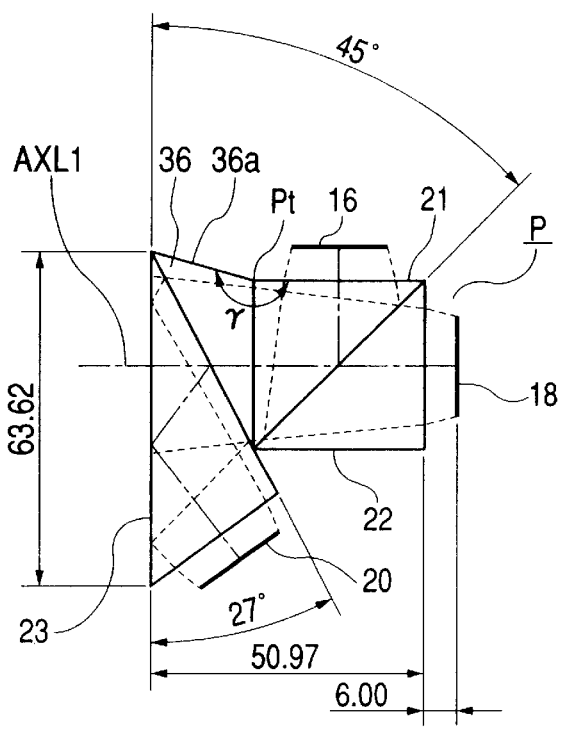
FIGS. 6A and 6B are cross-sectional views along the longer-side direction (color separation direction) and along the shorter-side direction of the image modulating means, of a design example of the color combining optical element in Embodiment 2 of the present invention.

The color combining optical element according to a second aspect of the invention is a color combining optical element comprising three or more prisms joined with each other, wherein one of the three prisms has a prism comprising a surface as a common surface serving as a total reflection surface and as a light-transmitting surface, on the extreme light exit side, the optical element has two dichroic mirrors for reflecting color light of two types of different wavelength regions, the two dichroic mirror layers are located so as not to cross each other, an outline of a cross section of a prism placed between the two dichroic mirror layers, cut by a plane along a color composition direction, is comprised of four or more segments, and at least one angle γ out of interior angles in the outline of the cross section is an angle exceeding 180° (see FIG. 6A).

The color combining optical element according to a third aspect of the invention is a color combining optical element comprising four or more prisms joined with each other, wherein one of the four prisms has a prism comprising a surface serving as a total reflection surface and as a light-transmitting surface, the optical element has two dichroic mirror layers for reflecting two color light beams of mutually different wavelength regions, i.e., of different colors, the two dichroic mirror layers are located so as not to cross each other, and a prism between the two dichroic mirror layers is comprised of a plurality of prisms (24, 21).

The color combining optical element according to a fourth aspect of the invention is a color combining optical element comprising, in the order named hereinafter from the light exit side, a first prism 23 comprising three or more optically smooth surfaces, among which one surface serves as a light-transmitting surface and as a total reflection surface; a second prism 24 comprising two or more optically smooth surfaces; a third prism 21 comprising three or more optically smooth surfaces; and a fourth prism 22 comprising two or more optically smooth surfaces, wherein one or both of opposed surfaces of the first prism and the second prism are provided with a dichroic mirror layer for reflecting first color light, and one or both of opposed surfaces of the third prism 21 and the fourth prism 22 are provided with a dichroic mirror layer for reflecting second color light of a color (wavelength region) different from that of the first color light.

In the fourth aspect of the invention it is preferable to construct the optical element so as to satisfy one or more of the configurations below.

(a-1) The first prism 23 and the second prism 24 are joined with the dichroic mirror layer in between, and the third prism 21 and the fourth prism 22 are joined with the dichroic mirror layer in between.

(a-2) The second prism 24 and the third prism 21 are joined with each other.

(a-3) Each of the third prism 21 and the fourth prism 22 is comprised of a right triangular prism having apex angles of 45°. In the first to fourth aspects of the present invention it is preferable to construct the optical element so as to satisfy one or more of the configurations below.

(a-4) The second prism and the third prism are integrally formed with each other.

(b-1) The angle θ1 between the surface with the dichroic mirror layer on the light exit side and the surface serving as the light-transmitting surface and as the total reflection surface, satisfies the following condition:

$$20°<θ1<35° \tag{1}$$

More desirably, the angle θ1 is set to satisfy the following condition:

$$22°<θ1<33° \tag{1A}$$

(b-2) The angle θ2 between the surface serving as the light-transmitting surface and as the total reflection surface and the surface with the dichroic mirror layer on the light entrance side, satisfies the following condition:

$$40°<θ2<50° \tag{2}$$

More desirably, the angle θ2 is set to satisfy the following condition:

$$42°<θ2<48° \tag{2A}$$

(b-3) The refractive index Nd for d-line of the material of the prisms satisfies the following condition:

$$1.56<Nd \tag{3}$$

More desirably, the refractive index Nd is set to satisfy the following condition:

$$1.6 < Nd \tag{3A}$$

(b-4) The Abbe's number vd of the material of the prisms satisfies the following condition:

$$40 < vd \tag{4}$$

More desirably, the Abbe's number vd is set to satisfy the following condition:

$$45 < vd \tag{4A}$$

The color combining optical element according to a fifth aspect of the invention is a color combining optical element comprising three or more prisms, wherein one of the three prisms has a prism comprising a surface serving as a total reflection surface and as a light-transmitting surface, on the extreme exit side, the optical element has two dichroic mirror layers for reflecting color light of two types of different wavelength regions, the two dichroic mirror layers are located so as not to cross each other, and the conditions below are met:

$$20° < \theta 1 < 35° \tag{1}$$

more desirably, $$22° < \theta 1 < 33° \tag{1A}$$

$$40° < \theta 2 < 50° \tag{2}$$

more desirably, $$42° < \theta 2 < 48° \tag{2A}$$

where

θ1; angle between the light exit surface of the color combining optical element and the dichroic mirror layer on the light exit side, and θ2; angle between the light exit surface of the color combining optical element and the dichroic mirror layer on the light entrance side.

In the fifth aspect of the invention, it is more preferable to satisfy the conditions below:

$$1.56 < Nd \tag{3}$$

more desirably, $$1.6 < Nd \tag{3A}$$

$$40 < vd \tag{4}$$

more desirably, $$45 < Nd \tag{4A}$$

where Nd; refractive index for d-line of the prisms, and vd; Abbe's number of the prisms.

A projection image display apparatus of the present invention comprises at least one of the above-stated color combining optical elements.

A projection image display apparatus according to the present invention comprises light generating means for emitting light including color components of the three primary colors, color separation means for separating the emitted light from the light generating means into three primary color beams, three image modulating means for receiving the three primary color beams and modulating the three primary color beams to form optical images, color combining means for composing one composite beam from output beams from the three image modulating means, and projection means for projecting the composite light composed by the color combining means, wherein the color combining means comprises at least one of the color combining optical elements described above.

The technical meanings of the respective conditions described above will be described below.

Condition (1) defines the angle θ1 between the surface 23B with the dichroic mirror layer on the light exit side and the light exit surface 23A of the color combining optical element. In the region below the lower limit of Condition (1), the total reflection condition is not met on the light exit surface 23A serving as the light-transmitting surface and as the total reflection surface in the prism 23 on the extreme light exit side in FIG. 4 and there will appear an eclipse of image. Thus the region below the lower limit is not preferred. In the region over the upper limit of Condition (1), the effective optical paths of the prism 23 on the extreme light exit side come to interfere with the dichroic mirror surface 23B of the prism on the extreme exit side, and the size of the prism 23 on the extreme exit side has to be increased in order to prevent the interference, so as to increase the optical path length of the entire color combining prism. Therefore, the region over the upper limit is not preferred.

Condition (2) defines the angle θ2 between the light exit surface 23A of the color combining optical element and the surface 21B with the dichroic mirror layer on the light entrance side. In the region below the lower limit of Condition (2), the light incidence surface 21C of the prism 21 is rotated counterclockwise in FIG. 4 so that the light incidence surface 21C of the prism 21 moves into the effective optical paths inside the prism. This is not preferred. In order to prevent it, the prism 21 has to be extended toward the light source, which increases the size of the prism.

In the region over the upper limit of Condition (2), the light incidence surface 21C of the prism 21 is rotated clockwise in FIG. 4 so that the image modulating means 16 and 18 illustrated in FIG. 4 approach each other, so as to interfere with each other. Thus it is not preferred.

Condition (3) defines the refractive index Nd for d-line of the material of the prisms making the color combining optical element. In the region below the lower limit of Condition (3), the air-reduced optical path length inside the prisms becomes longer, which is not preferred. In addition, the total reflection condition is not met on the total reflection surface of the prism on the extreme exit side, so as to decrease the amount of the light passing through the prism on the extreme light exit side. Thus it is not preferred.

Condition (4) defines the Abbe's number vd of the material of the prisms making the color combining optical element. In the region below the lower limit of Condition (4), the transmittance for blue becomes lowered in the case of currently available glass materials and if such a material were used for the prisms with a long optical path length the amount of light of the blue channel would decrease. Thus the region below the lower limit is not preferred.

Figure 2:
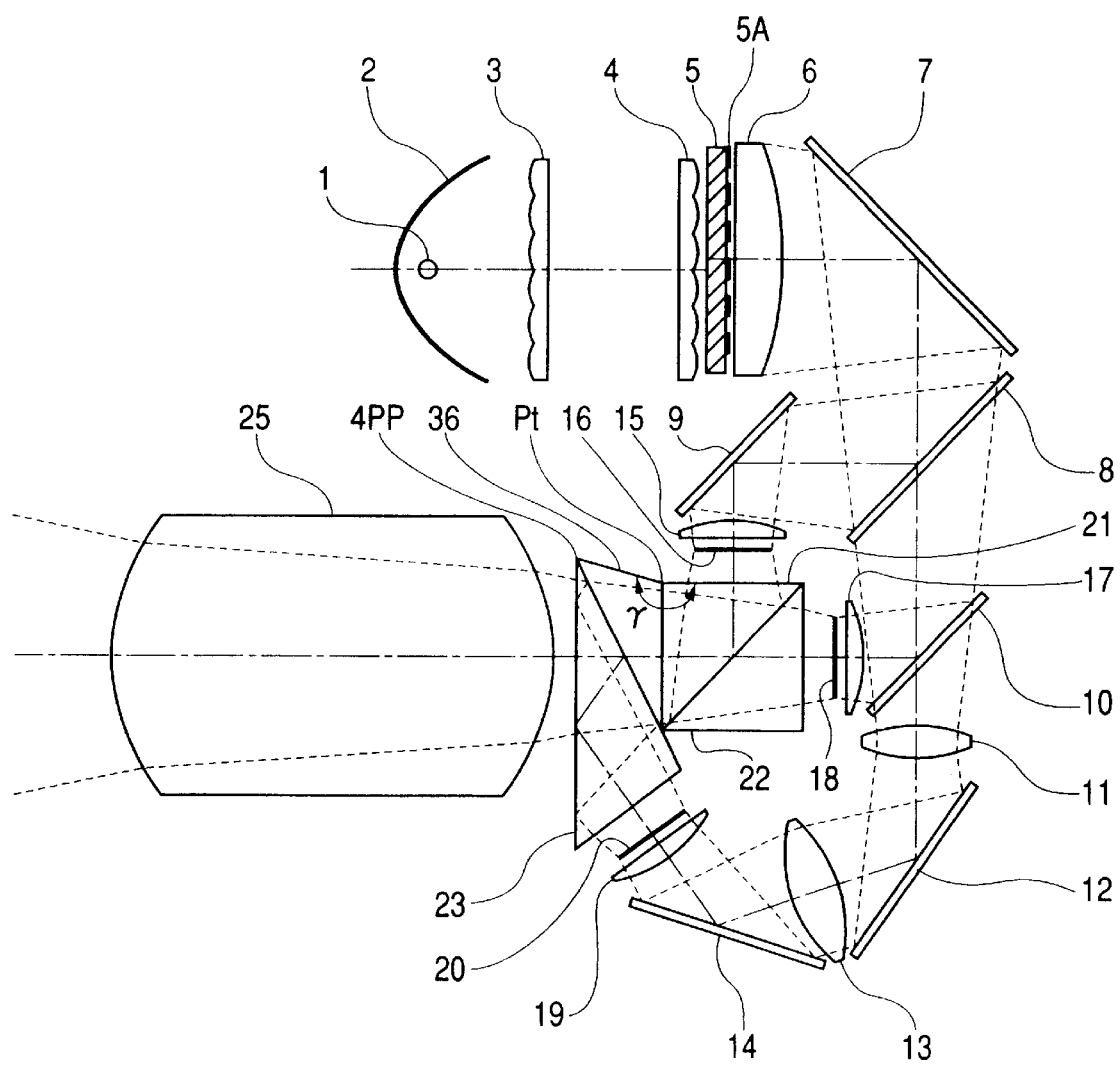
FIG. 2 is a schematic view to show the major part of Embodiment 2 of the projection image display apparatus using the color combining optical element of the present invention.

FIG. 2 is a schematic view to show the major part of Embodiment 2 of the projection type image display apparatus using the color combining optical element of the present invention. The present embodiment is substantially the same as Embodiment 1 except that the shape of the second prism 36 of the color combining optical element is different from that of the second prism 24 of FIG. 1.

The second prism 36 of FIG. 2 is constructed by obliquely cutting the illustrated upper part of the second prism 36, in order to prevent interference of the second prism 36 with the image modulating means 16. For this reason, the second prism 36 becomes smaller than that in FIG. 1, thus realizing reduction in weight of the second prism 36.

Figure 3:
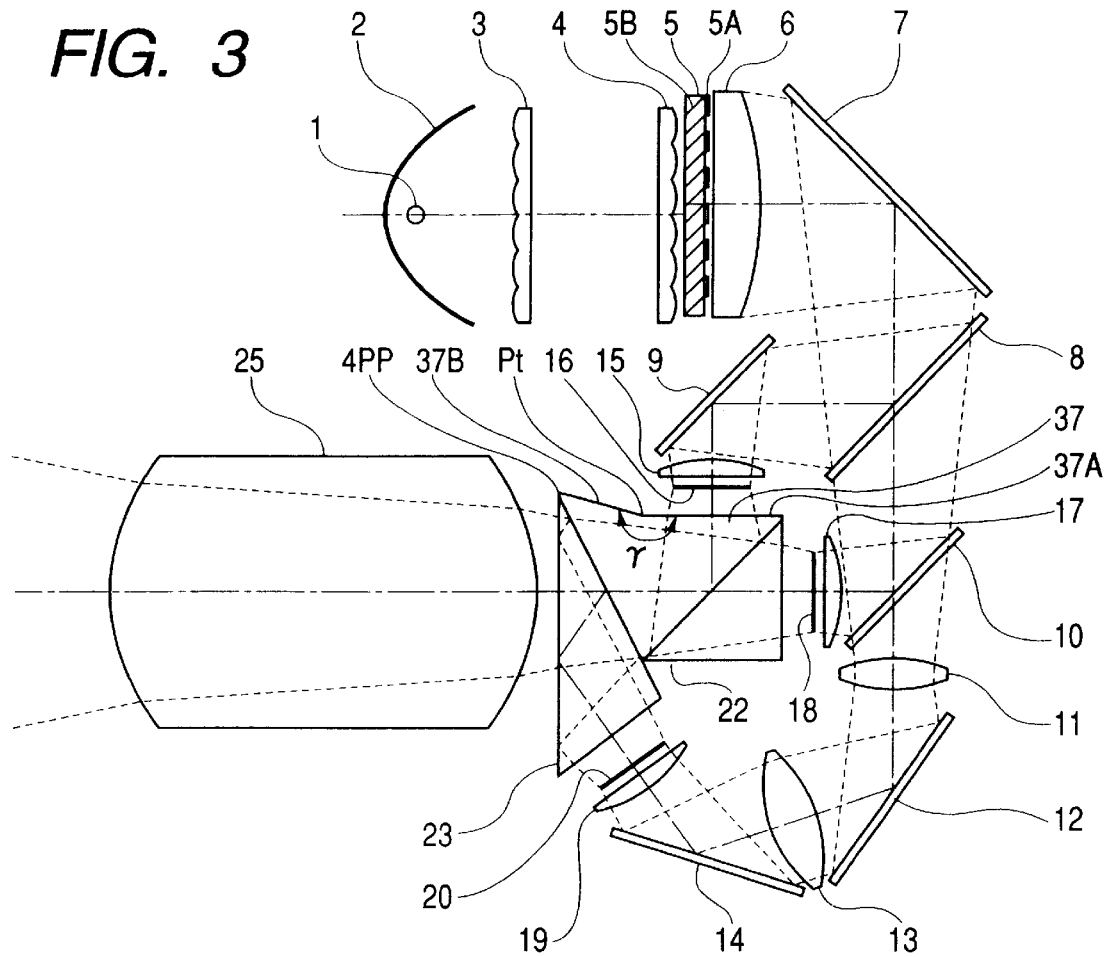
FIG. 3 is a schematic view to show the major part of Embodiment 3 of the projection image display apparatus using the color combining optical element of the present invention.

FIG. 3 is a schematic view to show the major part of Embodiment 3 of the projection type image display apparatus using the color combining optical element of the present invention. The present embodiment provides a configuration in which the second prism 36 and third prism 21 of FIG. 2 are integrated into one second prism 37. This shape can be made by fabricating the prism by only molding, without use of polishing. The surface without the dichroic mirror layer of the second prism 37 is composed of two planes 37A, 37B and the interior angle between the two planes (the prism-side angle) is 196°. By forming the second prism 37 in the shape as illustrated in FIG. 3, the prism path length of the color combining optical element can be shortened without causing an eclipse of the effective beam on the light exit side. When compared with the elements of FIG. 1 and FIG. 2, the number of parts of the prisms decreases, which permits further simplification and cost reduction.

The shape (size) of the color combining prisms according to the present invention will be described below in comparison with the conventional color combining prisms.

FIGS. 6A, 6B to FIGS. 9A, 9B are schematic views of prisms actually designed in respective types, for comparison in size among the prisms of the respective types. The data below is designed values on the assumption that the image modulating means 16, 18, 20 are liquid crystal panels of 0.9 inch (the effective display range of 18.288×13.716 mm), the projection lens is one having the F-number of 1.7, and the distance is 6 mm between the display surfaces 16, 18, 20 of the liquid crystal panels and the light incidence surface of the color combining prism P.

FIG. 6A is a cross-sectional view along the longer-side direction of the liquid crystal panels (the color separation direction of the color combining optical element) in a design example of the color combining optical element P of the present invention illustrated in FIG. 2. The prism material is the trade name S-BSM25 (the refractive index Nd=1.65844 and the Abbe's number vd=50.9) available from Ohara K.K.

The aforementioned angle $\theta 1$ is 27° and $\theta 2$ 45°. The air-reduced path length of the prism is 50.97/1.65844=30.73 mm.

Figure 6B:
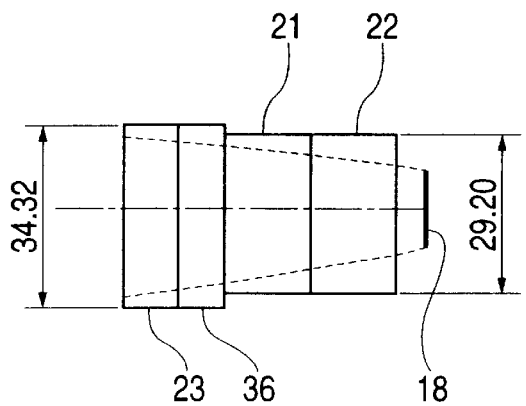

FIG. 6B shows the size of the cross section of the prism along the shorter-side direction of the liquid crystal panels in FIG. 6A. As shown in FIG. 6B, the height of the third and fourth prisms 21, 22 is designed to be smaller than that of the first and second prisms 23, 36 in order to reduce the weight.

Figure 7A:
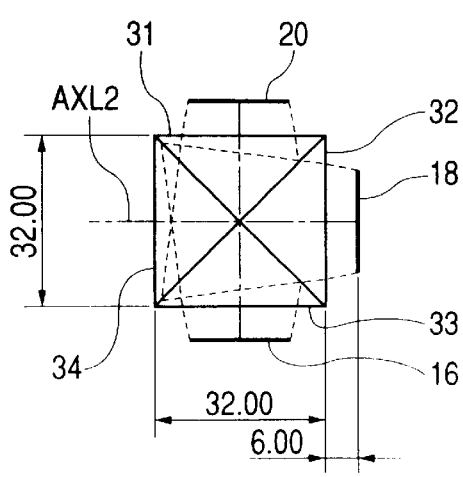
FIGS. 7A and 7B are cross-sectional views along the longer-side direction (color separation direction) and along the shorter-side direction, of a design example of the color combining optical element using the conventional cross dichroic prism.
Figure 7B:
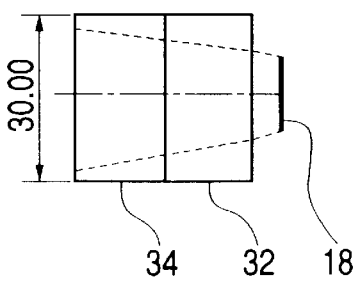

FIG. 7A is a cross-sectional view along the longer-side direction of the liquid crystal panels in a design example of the conventional cross dichroic prism. The prism material is the trade name S-BSL7 (the refractive index Nd=1.51633 and the Abbe's number vd=64.1) available from Ohara K.K. FIG. 7B is a cross-sectional view along the shorter-side direction of the liquid crystal panels, of the example of FIG. 7A.

The air-reduced path length of the prism is 32/1.51633= 21.10 mm.

This prism is a little smaller than the color combining prism of the present invention, but it has the drawbacks of high manufacturing cost, occurrence of the vertical stripe on the screen, etc. because of the aforementioned problems.

Figure 8A:
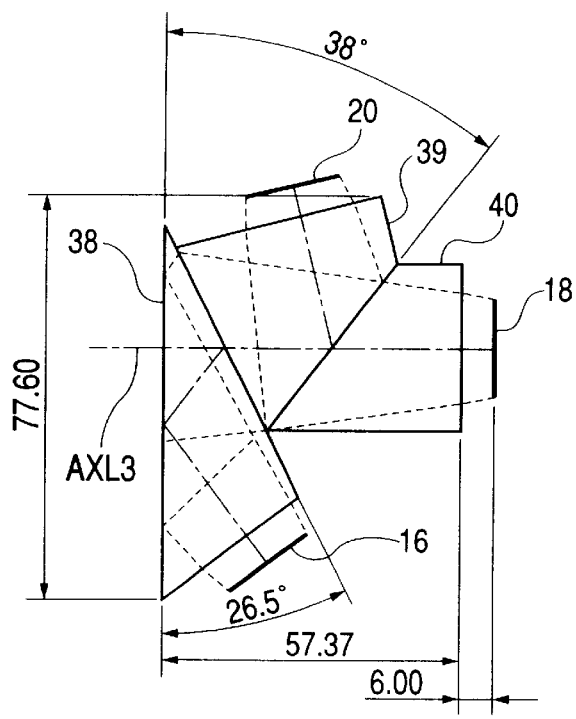
FIGS. 8A and 8B are cross-sectional views along the longer-side direction (color separation direction) and along the shorter-side direction, of a design example of the color combining optical element using the conventional three prisms.

FIG. 8A is a cross-sectional view along the longer-side direction of the liquid crystal panels in a design example of the color combining optical element using the conventional three prisms. The prism material is the trade name S-BSL7 (the refractive index Nd=1.51633 and the Abbe's number vd=64.1) available from Ohara K.K.

Figure 8B:
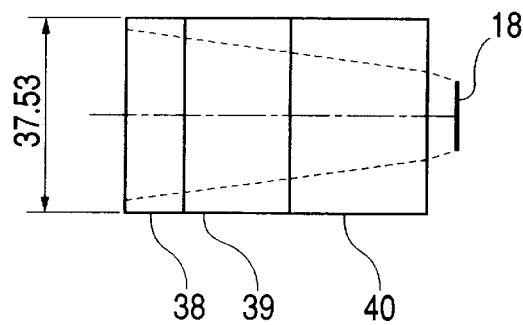

FIG. 8B is a cross-sectional view along the shorter-side direction of the liquid crystal panels, of the design example of FIG. 8A.

The air-reduced path length of the prism is 57.37/ 1.51633=37.83 mm.

The air-reduced path length of this prism is considerably longer than that of the color combining prism of the present invention. For this reason, the projection lens becomes quite large. Since the distance between the image modulating means 18 and 20 becomes fairly longer than that in the present invention, the illumination optical system becomes large.

Figure 9A:
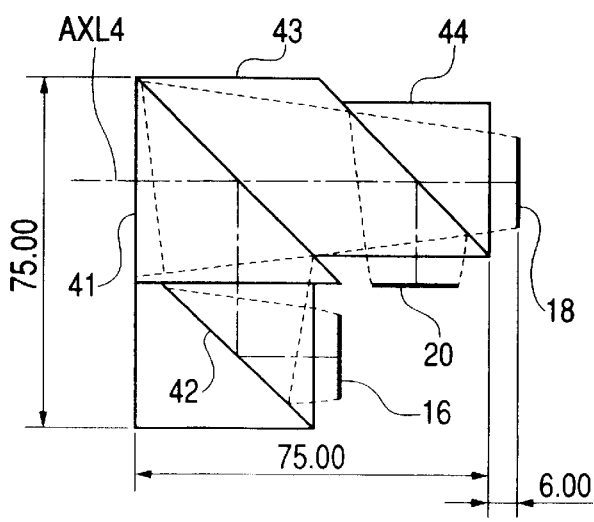
FIGS. 9A and 9B are cross-sectional views along the longer-side direction (color separation direction) and along the shorter-side direction, of a design example of the color combining optical element using the conventional four prisms.

FIG. 9A is a cross-sectional view along the longer-side direction of the liquid crystal panels, based on designed values of a prism as a combination of conventional rectangular prisms and rhomboidal prism. The prism material is the trade name S-BSL7 (the refractive index Nd=1.51633 and the Abbe's number vd=64.1) available from Ohara K.K.

Figure 9B:
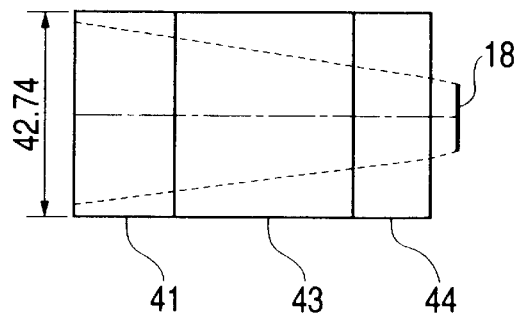

FIG. 9B is a cross-sectional view along the shorter-side direction of the liquid crystal panels, of the example of FIG. 9A.

The air-reduced path length of the prism is 75/1.51633= 49.46 mm. The air-reduced path length of this prism is extremely longer than that of the color combining prism of the present invention. For this reason, the back focus of the projection lens becomes very long and it becomes difficult to correct aberration. Thus the total lens length and the lens diameter become very large.

It is apparent from the comparison with these design examples that the color combining prism of the present invention is a little larger than the color combining optical element using the cross dichroic prism, but in comparison with the color combining optical elements of the other types wherein the two dichroic mirror layers do not cross inside the prism, the color combining prism of the present invention makes it feasible to considerably decrease the optical path length inside the prism and the air-reduced path length.

In each of the embodiments described above, the surfaces without optical action in each prism (for example, the surface 24c of the second prism 24 and the surface 22c of the fourth prism 22 in FIG. 4, the surface 37B of the second prism 37 in FIG. 3, the surface 36a of the second prism 36 in FIG. 6A, etc.) do not have to be limited to planes, but may be formed as curved surfaces.

As described above, since in the color combining optical elements according to the embodiments the dichroic mirror layers do not cross inside the prism, it becomes easier to manufacture the prisms and join the prisms, as compared with the conventional cross dichroic prism, so that the color combining optical element can be constructed at low manufacturing cost. Concerning the longer path length inside the prism than that of the cross dichroic prism, the increase in the air-reduced path length of the prism can be minimized by splitting the prism between the two dichroic mirror layers into two parts and increasing the refractive index of the prism, as against the color combining optical element consisting of the conventional three prisms.

This realizes the compact, high-performance projection type image display apparatus capable of being constructed at low manufacturing cost and presenting the projected image without degradation thereof nor occurrence of the vertical stripe on the screen.

What is claimed is:

1. A color combining optical element comprising:
   a prism having a surface serving as a total reflection surface and as a transmissive surface on an extreme exit side of the element; and
   at least one prism placed between two dichroic layers, said two dichroic layers reflecting light of mutually different wavelength regions and being located so as not to cross each other,
   wherein an outline of a cross section of said at least one prism, cut by a plane along a color composition direction, comprises four or more segments, and at least one flection point of the segments corresponding surfaces without the dichroic layers is present in an inner position of a segment connecting two ends of the segments corresponding surfaces with the two dichroic layers.

2. A color combining optical element comprising:
   having a surface serving as a total reflection surface and as a transmissive surface on extreme exit side of the element; and
   at least one prism placed between two dichroic layers, said two dichroic layers reflecting light of mutually different wavelength regions and being located so as not to cross each other,
   wherein an outline of a cross section of said at least one prism, cut by a plane along a color composition direction, comprises four or more segments, and at least one interior angle in the outline of the cross section is an angle exceeding 180°.

3. A color combining optical element comprising:
   having a surface serving as a total reflection surface and as a transmissive surface on the extreme exit side of the element; and
   at least one prism placed between two dichroic layers, said two dichroic layers reflecting light of mutually different wavelength regions, and being located so as not to cross each other, and
   wherein a plurality of prisms are placed between said two dichroic layers.

4. A color combining optical element comprising: in the order named hereinafter from the light exit side,
   a first prism comprising three or more optically smooth surfaces, among which one surface comprises a surface serving as a transmissive surface and as a total reflection surface;
   a second prism comprising two or more optically smooth surfaces;
   a third prism comprising three or more optically smooth surfaces;
   a fourth prism comprising two or more optically smooth surfaces; and
   a dichroic layer reflecting a first color light provided on one or both of opposed surfaces of the first prism and the second prism and a dichroic layer reflecting a second color light on one or both of opposed surfaces of the third prism and the fourth prism.

5. The color combining optical element according to claim 4, wherein the first prism and the second prism are joined with each other with said dichroic mirror layer in between and the third prism and the fourth prism are joined with each other with said dichroic mirror layer in between.

6. The color combining optical element according to claim 4, wherein the second prism and the third prism are joined with each other.

7. The color combining optical element according to either one of claims 1 to 4, wherein an angle $\theta_1$, between a surface with the dichroic mirror layer on the exit side and said common surface, satisfies the following condition:

$$20° < \theta_1 < 35°.$$

8. The color combining optical element according to either one of claims 1 to 4, wherein an angle $\theta_2$ between said common surface and a surface with the dichroic mirror layer on the entrance side out of said two dichroic minor layers, satisfies the following condition:

$$40° < \theta_2 < 50°.$$

9. The color combining optical element according to either one of claims 1 to 4, wherein a refractive index Nd for d-line of a material of said prisms satisfies the following condition:

$$1.56 < Nd.$$

10. The color combining optical element according to either one of claims 1 to 4, wherein an Abbe's number vd of a material of said prisms satisfies the following condition:

$$40 < vd.$$

11. The color combining optical element according to claim 4, wherein each of said third prism and said fourth prism is comprised of a right triangular prism having apex angles of 45°.

12. The color combining optical element according to claim 11, wherein said third prism and said fourth prism are integrally formed with each other.

13. A color combining optical element comprising:
   a prism having a surface serving as a total reflection surface and as a transmissive surface on an extreme exit side of rue element; and
   two dichroic layers reflecting color light of two types of different wavelength regions, and being located so as not to cross each other, and
   wherein when $\theta_1$ represents an angle between the common surface and the exit-side dichroic layer and $\theta_2$ represents an angle between the common surface and the entrance-side dichroic layer, the angles $\theta_1$ and $\theta_2$ satisfy the following conditions:

$$20° < \theta_1 < 35°, \text{ and}$$

$$40° < \theta_2 < 50°.$$

14. The color combining optical element according to claim 13, wherein when Nd represents a refractive index for d-line of a material of said prisms and vd an Abbe's number of the material of the prisms, Nd and vd satisfy the following conditions:

$$1.56 < Nd, \text{ and } 40 < vd.$$

15. A color combining optical element comprising: in the order named hereinafter from the light exit side,
   a first prism comprising three or more surfaces, among which one surface comprises a surface serving as a transmissive surface and as a total reflection surface;
   a second prism comprising two or more surfaces;
   a third prism comprising three or more surfaces; a fourth prism comprising two or more surfaces; and
   a first dichroic layer reflecting a first color light that is provided on one or both of opposed surfaces of the first prism kind the second prism, and a second dichroic layer reflecting a second color light on one or both of opposed surfaces of the third prism and the fourth prism, and wherein each of the third prism and the fourth prism is comprised of a right triangular prism having apex angles of 45°.

16. The color combining optical element according to either one of claims 1, 2, 3, 4, and 15, wherein when θ1 represents an angle between said common surface and the exit-side dichroic mirror layer out of said two dichroic mirror layers and θ2 represents an angle between the common surface and the entrance-side dichroic mirror layer, the angles θ1 and θ2 satisfy the following conditions:

20°<θ1<35°, and

40°<θ2<50°.

17. The color combining optical element according to either one of claims 1, 2, 3, 4, 13, and 15, wherein when θ1 represents an angle between said common surface and the exit-side dichroic mirror layer out of said two dichroic mirror layers and Nd represents a refractive index for d-line of a material of said prisms, θ1 and Nd satisfy the following conditions:

20°<θ1<35°, and 1.56<Nd.

18. The color combining optical element according to either one of claims 1, 2, 3, 4, 13, and 15, wherein the dichroic mirror layer farther from the exit side out of said two dichroic mirror layers is in contact with each of light incidence surfaces into two prisms in contact with said dichroic mirror layer.

19. A projection type image display apparatus comprising the color combining optical element as set forth in either one of claims 1, 2, 4, 13, and 15.

20. A projection type image display apparatus comprising light generating means for emitting light including color components of the three primary colors, color separation means for separating the light emitted from the light generating means, into three primary color light beams, three image modulating means for receiving the three primary color light beams and modulating the primary color light beams to form optical images, color combining means for composing one composite beam from output light beams from the three image modulating means, and projection means for projecting the composite light beam composed by the color combining means, wherein said color combining means is comprised of the color combining optical element as set forth in either one of claims 1, 2, 3, 4, 13, and 15.

21. A color separation optical element comprising:

a prism having a surface serving as a total reflection surface and as a transmissive surface on the extreme entrance side of the element; and at least one prism placed between two dichroic layers, said two dichroic layers reflecting light of mutually different wavelength regions, and being located so as not to cross each other, wherein an outline of a cross section of said at least one prism, cut by a plane along a color separation direction, comprises four or more segments, and at least one flection point of the segments corresponding surfaces without said dichroic layers is present in an inner position of a segment connecting two ends of the segments corresponding surfaces with said two dichroic layers.

22. A color separation optical element comprising:

a prism having a surface serving as a total reflection surface and as a transmissive surface on an extreme entrance side of the element; and a least one prism placed between two dichroic layers, said two dichroic layers reflecting light of mutually different wavelength regions and being located so as not to cross each other, wherein an outline of a cross section of said at least one prism, cut by a plane along a color separation direction, comprises four or more segments, and at least one of interior angles in the outline of the cross section is an angle exceeding 180°.

23. A color separation optical element comprising:

a prism having a surface serving as a total reflection surface and as a transmissive surface on an extreme entrance side of the element; and at least one prism placed between two dichroic layers reflecting light of mutually different wavelength regions and being located so as riot to cross each other, and wherein a plurality of prisms are placed between said two dichroic layers.

24. A color separation optical element comprising: in the order named hereinafter from the light entrance side, a first prism comprising three or more optically smooth surfaces, among which one surface comprises a common surface serving as a transmissive surface and as a total reflection surface;

a second prism comprising two or more optically smooth surfaces;

a third prism comprising three or more optically smooth surfaces; and a fourth prism comprising two or more optically smooth surfaces, wherein a dichroic layer reflecting first color light is provided on one or both of opposed surfaces of the first prism and the second prism and a dichroic layer reflecting second color light on one or both of opposed surfaces of the third prism and the fourth prism.

25. The color separation optical element according to claim 24, wherein the first prism and the second prism are joined with each other with said dichroic mirror layer in between and the third prism and the fourth prism are joined with each other with said dichroic mirror layer in between.

26. The color separation optical element according to claim 24, wherein the second prism and the third prism are joined with each other.

27. The color separation optical element according to either one of claims 21, 22, 23, and 24, wherein an angle θ1 between a surface with the dichroic mirror layer on the entrance side and said common surface, satisfies the following condition:

20°<θ1<35°.

28. The color separation optical element according to either one of claims 21, 22, 23, and 24, wherein an angle θ2 between said common surface and the exit-side dichromic mirror layer, satisfies the following condition:

40°<θ2<50°.

29. The color separation optical element according to either one of claims 21, 22, 23, and 24, wherein a refractive index Nd for d-line of a material of said prisms satisfies the following condition: 1.56<Nd.

30. The color separation optical element according to either one of claims 21, 22, 23, and 24, wherein an Abbe's number vd of a material of said prisms satisfies the following condition:

40<vd.

31. The color separation optical element according to claim 24, wherein each of said third prism and said fourth prism is comprised of a right triangular prism having apex angles of 45°.

32. The color separation optical element according to claim 31, wherein said third prism and said fourth prism are internally formed with each other.

33. A color separation optical element comprising:
a prism having a surface serving as a total reflection surface and as a transmissive surface on an extreme entrance side of the element; and
two dichroic layers reflecting color light of two types of different wavelength regions, and being located so as not to cross each other, and
wherein when θ1 represents an angle between the common surface and the entrance-side dichroic layer and θ2 represents an angle between the common surface and the exit-side dichroic layer, the angles θ1 and θ2 satisfy die following conditions:

20°<θ1<35°, and

40°<θ2<50°.

34. The color separation optical element according to claim 33, wherein when Nd represents a refractive index for d-line of a material of said prisms and vd an Abbe's number of the material of the prisms, Nd and vd satisfy the following conditions:

1.56<Nd, and

40<vd.

35. A color separation optical element comprising: in the order named hereinafter from the light entrance side,
a first prism comprising three or more surfaces, among which one surface comprises a surface serving as a transmissive surface and as a total reflection surface;
a second prism comprising two or more surfaces;
a third prism comprising three or more surfaces;
a fourth prism comprising two or more surfaces; and
a dichroic layer reflecting first color light is provided on one or both of opposed surfaces of the first prism and the second prism, and a dichroic layer reflecting second color light on one or both of opposed surfaces of the third prism and the fourth prism, and each of the third prism and the fourth prism is comprised of a right triangular prism having apex angles of 45°.

36. The color separation optical element according to either one of claims 21, 22, 23, 24, and 35, wherein when θ1 represents an angle between said common surface and the entrance-side dichroic mirror layer and θ2 represents an angle between the common surface and the exit-side dichroic mirror layer, the angles θ1 and θ2 satisfy the following conditions:

20°<θ1<35°, and

40°<θ2<50°.

37. The color separation optical element according to either one of claims 21, 22, 23, 24, 33, and 35, wherein when θ1 represents an angle between said common surface and the entrance-side dichroic mirror layer out of said two dichroic mirror layers and Nd represents a refractive index for d-line of a material of said prisms, θ1 and Nd satisfy the following conditions:

20°<θ1<35°, and 1.56<Nd.

38. The color separation optical element according to either one of claims 21, 22, 23, 24, 33, and 35, wherein the dichroic mirror layer farther from the entrance side out of said two dichroic mirror layers is in contact with each of light incidence surfaces into two prisms in contact with said dichroic mirror layer.

39. A projection type image display apparatus comprising the color separation optical element as set forth in either one of claims 21, 22, 23, 24, 33, and 35.

40. A projection type image display apparatus comprising light generating means for emitting light including color components of the three primary colors, color separation means for separating the light emitted from the light generating means, into three primary color light beams, three image modulating means for receiving the three primary color light beams and modulating the primary color light beams to form optical images, color combining means for composing one composite beam from output light beams from the three image modulating means, and projection means for projecting the composite light beam composed by the color combining means, wherein said color separation means is comprised of the color separation optical element as set forth in either one of claims 21, 22, 23, 24, 33, and 35.

* * * * *

UNITED STATES PATENT AND TRADEMARK OFFICE
CERTIFICATE OF CORRECTION

PATENT NO. : 6,671,101 B2
DATED : December 30, 2003
INVENTOR(S) : Saburo Sugawara It is certified that error appears in the above-identified patent and that said Letters Patent is hereby corrected as shown below:

Column 18,
Lines 7-8, delete "between said common" and insert therefor -- between a common --.
Line 67, delete "prism kind the" and insert therefore -- prism and the --

Column 19,
Line 9, delete "between said common" and insert therefore -- between a common --.

Column 20,
Line 26, delete "so as riot to" and insert therefore -- so as not to --
Line 59, delete "and said common" and insert therefore -- and a common --
Line 64, delete "between said common" and insert therefore -- between a common --

Column 21,
Line 26, delete "between the common" and insert therefore -- between a common --

Signed and Sealed this

Twenty-eighth Day of June, 2005

JON W. DUDAS
*Director of the United States Patent and Trademark Office*